United States Patent
Ishikawa

(10) Patent No.: US 10,027,261 B2
(45) Date of Patent: Jul. 17, 2018

(54) MOTOR APPARATUS

(71) Applicant: NIDEC SERVO CORPORATION, Kiryu-shi, Gunma (JP)

(72) Inventor: Masatomo Ishikawa, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 0 days.

(21) Appl. No.: 15/122,999

(22) PCT Filed: Mar. 4, 2015

(86) PCT No.: PCT/JP2015/056350
§ 371 (c)(1),
(2) Date: Sep. 1, 2016

(87) PCT Pub. No.: WO2015/133520
PCT Pub. Date: Sep. 11, 2015

(65) Prior Publication Data
US 2017/0077846 A1  Mar. 16, 2017

(30) Foreign Application Priority Data
Mar. 5, 2014  (JP) ................. 2014-042879

(51) Int. Cl.
*H02P 6/10* (2006.01)
*H02P 21/05* (2006.01)
(Continued)

(52) U.S. Cl.
CPC ............. *H02P 6/10* (2013.01); *F04D 27/004* (2013.01); *F04D 29/661* (2013.01); *H02P 21/05* (2013.01); *H02P 6/18* (2013.01)

(58) Field of Classification Search
CPC ............. H02P 21/05; H02P 6/10; H02P 6/18
See application file for complete search history.

(56) References Cited

U.S. PATENT DOCUMENTS

| | | | |
|---|---|---|---|
| 7,187,155 B2 * | 3/2007 | Matsuo | H02P 21/09 318/400.02 |
| 7,642,737 B2 * | 1/2010 | Bae | H02P 21/22 318/400.02 |

(Continued)

FOREIGN PATENT DOCUMENTS

| | | |
|---|---|---|
| JP | 2002-191184 A | 7/2002 |
| JP | 2002-223599 A | 8/2002 |

(Continued)

OTHER PUBLICATIONS

Official Communication issued in International Patent Application No. PCT/JP2015-056350, dated May 19, 2015.

*Primary Examiner* — Bickey Dhakal
*Assistant Examiner* — Said Bouziane
(74) *Attorney, Agent, or Firm* — Keating & Bennett, LLP

(57) ABSTRACT

A motor apparatus includes: an inverter arranged to drive a motor with a voltage outputted from a driving element; a rectifier circuit arranged to rectify alternating-current power to generate direct-current power to be applied to the driving element; a measuring section arranged to measure a voltage of the direct-current power; and a control circuit arranged to control the inverter in accordance with a result of a measurement by the measuring section; wherein the control circuit is arranged to vary an amplitude value of a drive signal to be applied to a base or gate of the driving element in a complementary manner in relation to a fluctuation in the voltage of the direct-current power.

3 Claims, 5 Drawing Sheets

(51) Int. Cl.
*F04D 27/00* (2006.01)
*F04D 29/66* (2006.01)
*H02P 6/18* (2016.01)

(56) References Cited

U.S. PATENT DOCUMENTS

| | | | |
|---|---|---|---|
| 8,707,932 B1 * | 4/2014 | Marin | F02D 41/3082 123/479 |
| 9,657,980 B2 * | 5/2017 | Song | F25B 49/025 |
| 2004/0052217 A1 * | 3/2004 | Anghel | H02P 6/18 370/254 |
| 2004/0232876 A1 | 11/2004 | Matsushiro et al. | |
| 2005/0280384 A1 | 12/2005 | Sulfstede | |
| 2006/0279248 A1 | 12/2006 | Borisavljevic | |
| 2007/0024231 A1 * | 2/2007 | Lee | H02P 1/04 318/802 |
| 2007/0046246 A1 | 3/2007 | Borisavljevic | |
| 2009/0104034 A1 | 4/2009 | Takada | |
| 2011/0000652 A1 | 1/2011 | Takada | |
| 2011/0266987 A1 * | 11/2011 | Markunas | H02P 25/03 318/400.24 |
| 2012/0065745 A1 * | 3/2012 | Suel, II | D06F 33/02 700/40 |
| 2012/0293106 A1 * | 11/2012 | Hirt | H02P 23/26 318/722 |
| 2014/0125261 A1 * | 5/2014 | Yamazaki | H02P 21/0039 318/400.02 |
| 2014/0210391 A1 * | 7/2014 | Bozic | H02P 6/181 318/400.11 |
| 2014/0265952 A1 * | 9/2014 | Katariya | H02P 21/0003 318/400.02 |

FOREIGN PATENT DOCUMENTS

| | | |
|---|---|---|
| JP | 2005-102455 A | 4/2005 |
| JP | 3653670 B2 | 6/2005 |
| JP | 2006-211831 A | 8/2006 |
| JP | 2008-043083 A | 2/2008 |
| JP | 2011-193672 A | 9/2011 |
| JP | 2011193672 A * | 9/2011 |

* cited by examiner

MOTOR APPARATUS

BACKGROUND OF THE INVENTION

1. Field of the Invention

The present invention relates to a brushless direct current motor, and has as an object to reduce vibrations and noise to a greater degree than can be achieved in related art.

2. Description of the Related Art

Brushless direct current motors are widely used in various fields. In connection with driving of motors used to drive fans, among such motors, WO 2007/040180 and WO 2009/110219 disclose a feature of calculating air volume on the basis of the rotation speed and electric drive current of a motor to control driving of the motor, thereby reducing a change in a flow (the air volume) caused by a change in a load. Meanwhile, Japanese Patent No. 3653670 and so on disclose a feature of controlling a motor with so-called vector control. In addition, in recent years, in driving of a motor of this type, a method of driving, with sinusoidal signals, driving elements which output drive voltages for phases of the motor to reduce vibrations and noise of the motor has often been adopted.

It is generally desirable that vibrations and noise of a motor be reduced to a greater degree.

The present invention has been made in view of the above circumstances, and has as an object to reduce vibrations and noise of a motor to a greater degree than can be achieved in related art.

The present inventors have conceived the idea of causing the amplitude of a drive voltage for driving a driving element to vary in a complementary manner in relation to a voltage fluctuation so as to cancel a fluctuation in an electric drive current caused by a fluctuation in power for driving, and completed the present invention.

SUMMARY OF THE INVENTION

According to an exemplary embodiment of the present invention, a motor apparatus includes an inverter arranged to drive a motor with a voltage outputted from a driving element; a rectifier circuit arranged to rectify alternating-current power to generate direct-current power to be applied to the driving element; a measuring section arranged to measure a voltage of the direct-current power; and a control circuit arranged to control the inverter in accordance with a result of a measurement by the measuring section; wherein the control circuit is arranged to vary an amplitude value of a drive signal to be applied to a base or gate of the driving element in a complementary manner in relation to a fluctuation in the voltage of the direct-current power.

According to the exemplary embodiment of the present invention, in the case where the voltage of the direct-current power obtained by rectifying the alternating-current power fluctuates, the driving element can be driven so as to cancel a fluctuation in electric drive current caused by this voltage fluctuation, and vibrations and noise of the motor can thus be reduced to a greater degree.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, embodiments of the present invention will be described with reference to the accompanying drawings.

(Basic Configuration of Motor Apparatus)

Figures 1, 2:
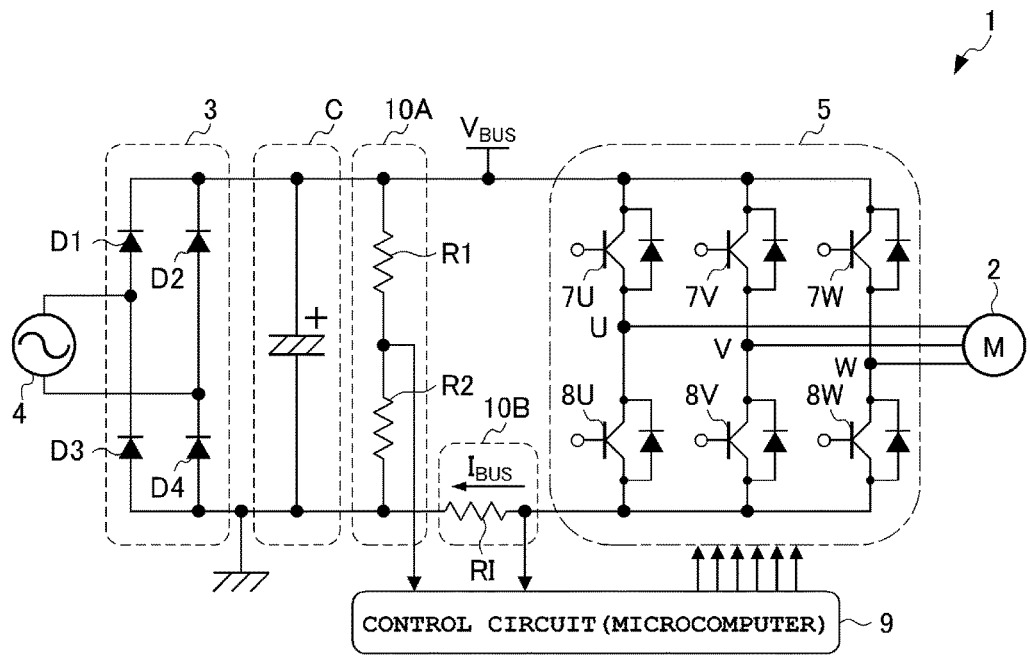
FIG. 1 is a block diagram illustrating a motor apparatus according to a first embodiment of the present invention.
FIG. 2 is a block diagram illustrating the motor apparatus illustrated in FIG. 1 in detail.
Figure 3:
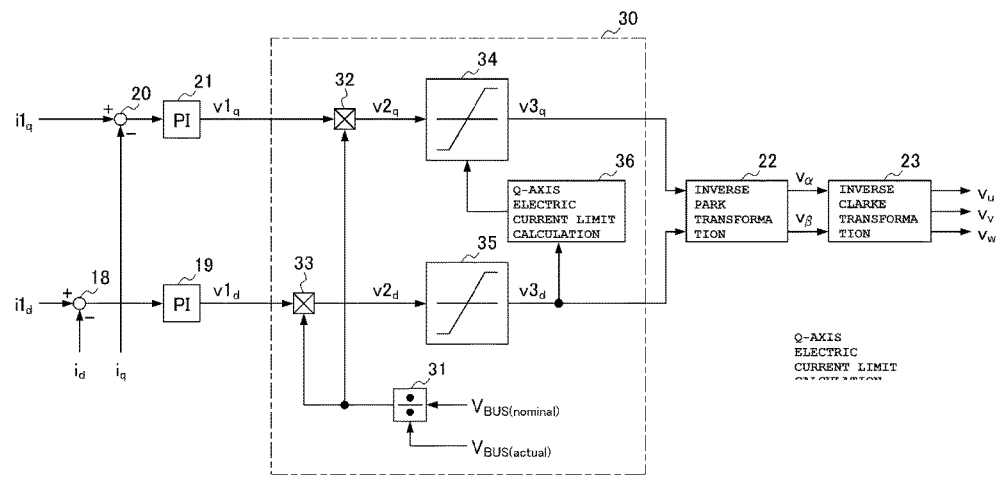
FIG. 3 is a diagram for explaining a voltage command correction section.

FIG. 1 is a block diagram illustrating the basic configuration of a motor apparatus according to a first embodiment of the present invention. A motor apparatus 1 is applied to a blower apparatus that blows air by driving a fan through a three-phase brushless direct current motor 2. The blower apparatus is used, for example, as a ventilator for the interior of a room. In the motor apparatus 1, an electric current supplied from an alternating-current power supply 4 is rectified by a rectifier circuit 3 including a full-wave rectifier circuit using diodes D1 to D4. The rectified electric current is smoothed by a smoothing capacitor C. A voltage of the electric current supplied from the alternating-current power supply 4 is thus converted into a direct-current voltage $V_{BUS}$, which is applied to an inverter 5. Here, the inverter 5 includes three pairs of series circuits, which are formed by driving elements 7U, 7V, 7W, 8U, 8V, and 8W, such as transistors, field-effect transistors (FETs), or the like. Each series circuit is arranged between a direct-current power supply and an earth line. A middle connection point of each series circuit is connected to a winding of a separate one of U, V, and W phases of the motor 2. In addition, in the inverter 5, a base (gate) of each of the driving elements 7U, 7V, 7W, 8U, 8V, and 8W is switched on and off through a drive circuit, which is not shown. The inverter 5 thus drives the motor 2 through output voltages of the driving elements 7U, 7V, 7W, 8U, 8V, and 8W. Note that each of the driving elements 7U, 7V, 7W, 8U, 8V, and 8W is provided with a protection diode.

In addition, in the motor apparatus 1, a control circuit 9 is a microcomputer. Direct-current power obtained by converting alternating-current power to direct-current power with a low voltage is inputted to the control circuit 9 through a power supply circuit, which is not shown. A measuring section 10A measures the direct-current voltage (i.e., applied voltage) $V_{BUS}$, which is applied to the driving elements 7U, 7V, 7W, 8U, 8V, and 8W. In this preferred embodiment, a voltage divider circuit 10A is used as the measuring section 10A. The voltage divider circuit 10A includes a resistor R1 and a resistor R2. The voltage divider circuit 10A subjects the direct-current voltage applied to the driving elements 7U, 7V, 7W, 8U, 8V, and 8W to voltage division. A direct-current voltage obtained by this voltage division is inputted to an internal analog-to-digital conversion circuit in the control circuit 9. The direct-current voltage (i.e., applied voltage) $V_{BUS}$ applied to the driving elements 7U, 7V, 7W, 8U, 8V, and 8W is thus measured. Further, an electric current detection circuit 10B includes a resistor RI for detecting an electric current, and is provided at the earth line. The motor apparatus 1 is thus configured to be capable of detecting the sum of electric drive currents for all the phases. A result of a detection by the electric current detection circuit 10B is inputted to the control circuit 9 through an internal analog-to-digital conversion circuit. The control circuit 9 is thus able to detect the electric drive current for each phase.

The control circuit 9 performs a predetermined procedure to control an operation of the inverter 5 on the basis of the voltage $V_{BUS}$ of the direct-current power and the result of the detection of the electric drive current for each phase, which are obtained through the aforementioned analog-to-digital conversion circuits.

FIG. 2 is a block diagram illustrating functional blocks implemented in the performance of the procedure by the control circuit 9, along with peripheral components. The control circuit 9 drives the motor 2 by applying a vector control technique with this structure of the functional blocks.

In the motor apparatus 1, an electric current sensor 11 (the electric current detection circuit 10B) detects the electric drive current $i_{uv}$ for each phase. A Clarke transformation section 12 subjects the electric drive current $i_{uv}$ for each phase, which is detected by the electric current sensor 11, to Clarke transformation, and outputs an electric drive current vector $I_{\alpha\beta}$ in a two-phase stationary reference frame. A position and speed estimation section 13 calculates an electrical angular speed $\omega_e$ and a rotation angle $\theta_e$ of a rotor from the electric drive current vector $I_{\alpha\beta}$ in the two-phase stationary reference frame and a drive voltage $V_{\alpha\beta}$ in the two-phase stationary reference frame corresponding to the electric drive current vector $I_{\alpha\beta}$, and outputs the electrical angular speed $\omega_e$ and the rotation angle $\theta_e$.

A computation section 15 calculates and outputs a sine value and a cosine value of the rotation angle $\theta_e$ calculated by the position and speed estimation section 13. A Park transformation section 14 subjects the electric drive current vector $I_{\alpha\beta}$ in the two-phase stationary reference frame to Park transformation using the results of the calculation by the computation section 15. The Park transformation section 14 converts the electric drive current vector $I_{\alpha\beta}$ in the two-phase stationary reference frame to a q-axis electric drive current $i_q$ and a d-axis electric drive current $i_d$ in a rotating reference frame, and outputs the q-axis electric drive current $i_q$ and the d-axis electric drive current $i_d$.

In the motor apparatus 1, a flow coefficient $K'_Q$, which is used as a target value for control of air volume, is inputted from a higher-level controller or the like to the control circuit 9. A multiplier 16 multiplies the electrical angular speed $\omega_e$ estimated by the position and speed estimation section 13 by the flow coefficient $K'_Q$ to calculate a constant air volume target electric drive current. In the control circuit 9, feedback control is performed so that the q-axis electric drive current $i_q$ will coincide with the constant air volume target electric drive current. The control circuit 9 thus drives the motor 2 in such a manner that the air volume will be maintained at a constant value corresponding to the flow coefficient $K'_Q$.

Here, on the assumption that Q denotes the air volume (i.e., flow) in air blowing, N [r/min] denotes the rotation rate of the motor which is used for the air blowing, and P [W] denotes the power of this motor, the air volume Q and the rotation rate N are in proportion to the power P, and this proportional relation is expressed by the following mathematical relation.

[Math. 1]

$$QN^2 \propto P \quad (1)$$

This indicates that, in order to maintain the air volume Q at a constant value, control should be performed so that $P/N^2$ will be constant. Here, when a coefficient ($K_Q \propto Q$) that is proportional to the air volume Q is defined, expression (1) can be rewritten as the following equation.

[Math. 2]

$$K_Q \cdot N^2 = P \quad (2)$$

The rotation rate N and the power P are converted to physical quantities used in vector control software. Note that a unit conversion may be performed for the physical quantities appropriately in accordance with a system of units and the type of the software. Also note that unit conversions of other values may be made to calculate the physical quantities.

Here, the rotation rate N can be expressed by the following equation, using the electrical angular speed $\omega_e$ [rad/sec] and the number $P_P$ of pole pairs of the motor.

[Math. 3]

$$N = \frac{60}{2\pi \cdot P_P} \cdot \omega_e \quad (3)$$

In addition, the motor power P can be expressed by the following equation, using a mechanical angular speed $\omega_m$ [rad/sec] and a torque $\tau$ generated by the motor.

[Math. 4]

$$P = \tau \omega_m \quad (4)$$

Further, in a common brushless DC motor (e.g., a surface permanent magnet synchronous motor), the torque $\tau$ can be expressed by the following equation, using the product of the number $P_P$ of pole pairs, intensity $\Phi$ [Vs/rad] of rotor magnetic flux, and the q-axis electric drive current $i_q$.

[Math. 5]

$$\tau = P_P \cdot \Phi \cdot i_q \quad (5)$$

Further, the relation between the mechanical angular speed $\omega_m$ and the electrical angular speed $\omega_e$ can be expressed by the following equation.

[Math. 6]

$$\omega_m = \frac{1}{P_P} \cdot \omega_e \quad (6)$$

Here, substituting Eq. (5) and Eq. (6) into Eq. (4) yields the following mathematical relation.

[Math. 7]

$$P = \Phi \cdot i_q \cdot \omega_e \quad (7)$$

Substituting Eq. (7) and Eq. (3) into Eq. (2) yields the following mathematical relation. Eq. (8) expresses a mathematical relation between the electrical angular speed $\omega_e$ and the q-axis electric drive current $i_q$ for maintaining the air volume Q at a constant value.

[Math. 8]

$$\left(\frac{60}{2\pi \cdot P_p}\right)^2 \cdot \frac{1}{\Phi} \cdot K_Q \cdot \omega_e = i_q \quad (8)$$

Here, Eq. (8) can be expressed as the following equation using the flow coefficient $K'_Q$.

[Math. 9]

$$K'_Q \cdot \omega_e = i_q \quad (9)$$

Note that the flow coefficient $K'_Q$ is expressed by the following equation.

[Math. 10]

$$K'_Q = \left(\frac{60}{2\pi \cdot P_p}\right)^2 \cdot \frac{1}{\Phi} \cdot K_Q \quad (10)$$

Thus, in the motor apparatus 1, the motor can be driven to maintain the air volume at a constant value by maintaining the proportional relation between the electrical angular speed $\omega_e$ and the q-axis electric drive current $i_q$. Thus, the flow coefficient $K'_Q$ is inputted to the control circuit 9 to be used as the target value for the control of the air volume. The multiplier 16 computes a product value on the left side of Eq. (9) by multiplying the electrical angular speed $\omega_e$ detected by the position and speed estimation section 13 by the flow coefficient $K'_Q$, thus calculating the value of the constant air volume target electric drive current, which is a control-target electric drive current, and outputs the value of the constant air volume target electric drive current to a subtraction circuit 18 through a switch section 17. The subtraction circuit 18 subtracts the q-axis electric drive current $i_q$ calculated by the Park transformation section 14 from an output value of the switch section 17, and outputs the resultant value. A PI controller (PI) 19 amplifies the output value of the subtraction circuit 18 using a predetermined gain, and, after calculating a moving integral of the output value of the subtraction circuit 18, amplifies the moving integral using a predetermined gain, and makes an addition. The PI controller (PI) 19 thus calculates a control value in proportional-integral control. A subtraction circuit 20 calculates and outputs a value of a difference between the d-axis electric drive current $i_d$ calculated by the Park transformation section 14 and a corresponding control-target value (in this embodiment, a value of 0). A PI controller (PI) 21 calculates and outputs a control value in proportional-integral control in relation to the subtraction circuit 20. Note that the control-target value may alternatively be set to a value other than 0. Also note that a follow-up controller other than the PI controller may alternatively be used.

An inverse Park transformation section 22 subjects a q-axis drive voltage Vq and a d-axis drive voltage Vd, which are outputted from the PI controllers 19 and 21, respectively, through a voltage command correction section 30 to inverse Park transformation using a result of calculation by the computation section 15, and outputs a drive voltage vector $V_{\alpha\beta}$ in the two-phase stationary reference frame. An inverse Clarke transformation section 23 subjects the drive voltage vector $V_{\alpha\beta}$ in the two-phase stationary reference frame, which is outputted from the inverse Park transformation section 22, to inverse Clarke transformation, and outputs the result. The inverter 5 performs pulse width modulation concerning a drive voltage vector $V_{UVW}$ in a three-phase stationary reference frame, which is outputted from the inverse Clarke transformation section 23. On the basis of a pulse width modulation signal obtained as a result of the pulse width modulation, drive voltages are applied to coils of the motor 2 to drive the motor 2.

Thus, in the motor apparatus 1, the value of the product of the flow coefficient $K'_Q$ and the electrical angular speed $\omega_e$ according to Eq. (9) is used as a constant air volume q-axis target electric drive current $i1_q$. Further, in the motor apparatus 1, feedback control is performed so that the electric drive current $i_q$ will coincide with the target electric drive current $i1_q$, to drive the motor with constant air volume control to maintain the air volume at a constant value.

Here, it is desirable to set a minimum value and a maximum value of the rotation speed of the motor 2 in driving the motor 2. Specifically, while the motor 2 is rotating at a low speed, the electric drive current and drive voltage of the motor 2 are low at the time of a light load. This may reduce precision with which the position and speed of the rotor of the motor 2 are estimated, which may make stable driving of the motor 2 difficult. It is therefore desirable to set the minimum value of the rotation speed of the motor 2. Meanwhile, when the motor 2 rotates at a high speed, it is necessary to protect a circuit and the motor from generated heat and vibrations. It is therefore desirable to set the maximum value of the rotation speed of the motor 2.

Accordingly, in the motor apparatus 1, a speed-control target value, which is a selected one of a speed maximum value $\omega_{max}$ and a speed minimum value $\omega_{min}$, is inputted to a subtraction circuit 26. The subtraction circuit 26 calculates a value of a difference between the inputted speed-control target value and the electrical angular speed $\omega_e$ estimated by the position and speed estimation section 13. The calculated value of the difference is inputted to a PI controller 27. The PI controller 27 calculates a constant speed q-axis target electric drive current $i1_q$ in proportional-integral control, and outputs the calculated constant speed q-axis target electric drive current $i1_q$ to the switch section 17. In the motor apparatus 1, a determination section (not shown) compares the electrical angular speed $\omega_e$ estimated by the position and speed estimation section 13 with the speed maximum value $\omega_{max}$ and the speed minimum value $\omega_{min}$ to make a determination. On the basis of the determination by the determination section, the operation of the switch section 17 and the speed-control target value are switched. The control of the motor 2 is thus switched between the constant air volume control and constant speed control, and the motor 2 is driven in such a manner that the rotation speed will not exceed the maximum value or fall below the minimum value.

More specifically, in a situation in which the motor 2 is being driven with the constant air volume control with the product value from the multiplier 16 outputted to the subtraction circuit 18 through the switch section 17, if the electrical angular speed $\omega_e$ estimated by the position and speed estimation section 13 exceeds the maximum value $\omega_{max}$, the determination section sets the speed-control target value to the maximum value $\omega_{max}$, and switches the operation of the switch section 17 to allow the output value of the PI controller 27 to be outputted to the subtraction circuit 18. The control of the motor 2 is thus switched from the constant air volume control to the constant speed control to maintain the rotation speed of the motor 2 at the maximum value $\omega_{max}$.

Meanwhile, in a situation in which the motor 2 is running with the rotation speed of the motor 2 being maintained at the maximum value $\omega_{max}$ by the constant speed control as described above, if the constant speed q-axis target electric drive current $i1_q$ outputted from the PI controller 27 reaches or exceeds the value, $K'_Q \cdot \omega_e$, of the product of the flow coefficient $K'_Q$ and the electrical angular speed $\omega_e$ estimated by the position and speed estimation section 13, the product value from the multiplier 16 is outputted to the subtraction circuit 18 through the switch section 17 to drive the motor 2 with the constant air volume control. That is, the control of the motor 2 is switched by the switch section 17 from the constant speed control to the constant air volume control.

Further, in the situation in which the motor 2 is being driven with the constant air volume control, if the electrical angular speed $\omega_e$ estimated by the position and speed estimation section 13 falls below the minimum value $\omega_{min}$, the determination section sets the speed-control target value to the minimum value $\omega_{min}$, and switches the operation of the switch section 17 to allow the output value of the PI controller 27 to be outputted to the subtraction circuit 18. The control of the motor 2 is thus switched from the constant air volume control to the constant speed control to maintain the rotation speed of the motor 2 at the minimum value $\omega_{min}$.

Meanwhile, in the situation in which the motor 2 is running with the rotation speed of the motor 2 being maintained at the minimum value $\omega_{min}$ by the constant speed control as described above, if the constant speed q-axis target electric drive current $i1_q$ outputted from the PI controller 27 falls below the value, $K'_Q \cdot \omega_e$, of the product of the flow coefficient $K'_Q$ and the electrical angular speed $\omega_e$ estimated by the position and speed estimation section 13, the product value from the multiplier 16 is outputted to the subtraction circuit 18 through the switch section 17 to drive the motor 2 with the constant air volume control. That is, the control of the motor 2 is switched by the switch section 17 from the constant speed control to the constant air volume control.

Note that, in each of the driving with the constant air volume control and the driving with the constant speed control at the maximum value or the minimum value of the rotation speed as described above, a hysteresis characteristic may be provided. Also note that, as for follow-up, the follow-up may not be instantaneous. For example, in the case where an abrupt change in load has caused an abrupt change in the air volume, the driving of the motor 2 may not instantaneously follow the change in the air volume. This contributes to reducing an abrupt change in noise produced from the fan as a result of an abrupt change in the rotation rate.

(Correction of Voltage Command Values)

In the motor apparatus 1, a drive signal in the form of a sinusoidal signal is supplied to the base (gate) of each of the driving elements 7U, 7V, 7W, 8U, 8V, and 8W to drive the motor 2. In addition, the pulse width modulation signal is generated with a duty ratio varied in accordance with the output value of the inverse Clarke transformation section 23. The amplitude of the drive signal is varied in accordance with the duty ratio of the pulse width modulation signal. The motor 2 is thus driven with a desired condition (the condition of the constant air volume). In the case where each of the driving elements 7U, 7V, 7W, 8U, 8V, and 8W is switched on and off in accordance with the drive signal in the form of the sinusoidal signal to drive the motor 2 as described above, vibrations and noise caused by the motor 2 can be reduced.

However, the direct-current voltage $V_{BUS}$ applied to the driving elements 7U, 7V, 7W, 8U, 8V, and 8W is a voltage obtained by rectifying an alternating-current voltage through the diodes D1 to D4, and smoothing the rectified voltage through the smoothing capacitor C. Therefore, if the electric drive current is increased by an increase in the load of the motor, the fluctuation in the direct-current voltage $V_{BUS}$ increases. If the fluctuating direct-current voltage $V_{BUS}$ is supplied to the inverter 5, the output voltage of each of the driving elements 7U, 7V, 7W, 8U, 8V, and 8W, which are originally driven by a sine wave voltage, may be distorted, leading to a distortion in the electric drive currents for the motor 2. This may cause increases in noise and vibrations of the motor at the time of a heavy load. Therefore, in this embodiment, the fluctuation in the direct-current voltage is compensated to reduce the noise and vibrations of the motor 2.

In this embodiment, in the voltage command correction section 30, the control value to be inputted to the inverse Park transformation section 22 is corrected so as to vary in a complementary manner in relation to the fluctuation in the power supply voltage. This contributes to preventing the waveform of the electric drive current from being distorted. Further, this correction contributes to reducing the vibrations and noise of the motor 2 to a greater degree than can be achieved in related art. More specifically, in this embodiment, the control value for the driving of each of the driving elements 7U, 7V, 7W, 8U, 8V, and 8W is increased or decreased in accordance with the voltage fluctuation in the direct-current voltage using a reference value $V_{BUS(nominal)}$ for the direct-current voltage $V_{BUS}$ as a reference. Thus, the amplitude value of the drive signal to be supplied to each of the driving elements 7U, 7V, 7W, 8U, 8V, and 8W is varied in a complementary manner in relation to the fluctuation in the power supply voltage. This contributes to preventing the waveform of the electric drive current in the motor 2 from being distorted.

In the voltage command correction section 30, a divider circuit 31 divides an instantaneous voltage $V_{BUS(actual)}$ of the direct-current power ($V_{BUS}$) by a reference voltage $V_{BUS(nominal)}$, which is a reference value for the instantaneous voltage $V_{BUS(actual)}$, to calculate a correction coefficient. A multiplier 32 multiplies a control value (a q-axis electric current control value $v1_q$) before correction outputted from the PI controller 21 by the correction coefficient calculated by the divider circuit 31 to calculate a corrected control value $v2_q$. A multiplier 33 multiplies a control value (a d-axis electric current control value $v1_d$) before correction outputted from the PI controller 19 by the correction coefficient calculated by the divider circuit 31 to calculate a corrected control value $v2_d$. The value of each of the corrected control values $v2_q$ and $v2_d$ is increased or decreased in a complementary manner in accordance with the fluctuation in the direct-current voltage $V_{BUS}$. The correction process as described above can be expressed by the following equation.

[Math. 11]

$$\begin{bmatrix} v2d \\ v2q \end{bmatrix} = \frac{V_{BUS(nominal)}}{V_{BUS(actual)}} \cdot \begin{bmatrix} v1d \\ v1q \end{bmatrix} \tag{11}$$

Further, the voltage command correction section 30 limits the control values $v2_q$ and $v2_d$ calculated in the above-described manners through limiting sections 34 and 35, respectively. Each of the calculated control values $v2_q$ and $v2_d$ is thus limited so as not to exceed either of a maximum value and a minimum value that allow control.

Specifically, a maximum value $v_{limit}$ and a minimum value $-v_{limit}$ that allow control are set beforehand in the limiting section 35 for the d-axis electric current control value $v2_d$. In the case where the control value $v2_d$ is greater than the maximum value $v_{limit}$ or less than the minimum value $-v_{limit}$, the limiting section 35 sets a control value via to the maximum value $v_{limit}$ or the minimum value $-v_{limit}$, respectively, as expressed by the following equations.

[Math. 12]

$v_{limit} < v2d$ then $v3d = v_{limit}$ (positive-side limiting process)

$-v_{limit} > v2d$ then $v3d = -v_{limit}$ (negative-side limiting process)

$-v_{limit} < v2d < v_{limit}$ then $v3d = v2d$ (within the limits) (12)

A q-axis electric current limit calculation section 36 performs a computation process as expressed by the following equation on the basis of the control value v3limit set by the limiting section 35 for the d-axis electric current control value $v2_d$ to calculate a limit value $v_{qlimit}$ for a q-axis electric current.

[Math. 13]

$$v_{qlimit} = \sqrt{(v3_{limit})^2 - (v2d)^2} \quad (13)$$

The limiting section 34 for the q-axis electric current control value $v2_q$ sets a maximum value $v_{qlimit}$ and a minimum value $-v_{qlimit}$ on the basis of the limit value $v_{qlimit}$ calculated by the q-axis electric current limit calculation section 36. As expressed by the following equations, the limiting section 34 makes a determination as to the control value $v2_q$ for the q-axis electric current, and sets a control value $v3_q$ to the maximum value $v_{qlimit}$ or the minimum value $-v_{qlimit}$ if the control value $v2_q$ is greater than the maximum value $v_{qlimit}$ or less than the minimum value $-v_{qlimit}$, respectively.

[Math. 14]

$v_{qlimit} < v2q$ then $v3q = v_{qlimit}$ (positive-side limiting process)

$-v_{qlimit} > v2q$ then $v3q = -v_{qlimit}$ (negative-side limiting process)

$-v_{qlimit} < v2q < v_{qlimit}$ then $v3q = v2q$ (within the limits) (14)

Thus, the control circuit 9 corrects the control values $v_d$ and $v_q$ so as to compensate the fluctuation in the power supply voltage $V_{BUS}$ to calculate the control values $v3_d$ and $v3_q$, and drives the motor 2 on the basis of the calculated control values $v3_d$ and $v3_q$.

The inverse Park transformation section 22 performs a computation process as expressed by the following equation, thus subjecting the control values $v3_d$ and $v3_q$ to inverse Park transformation, to calculate voltage control values $v_\alpha$ and $v_\beta$ in a $\alpha\beta$ stationary reference frame.

[Math. 15]

$$\begin{bmatrix} v_\alpha \\ v_\beta \end{bmatrix} = \begin{bmatrix} \cos\theta & -\sin\theta \\ \sin\theta & \cos\theta \end{bmatrix} \begin{bmatrix} v3d \\ v3q \end{bmatrix} \quad (15)$$

The inverse Clarke transformation section 23 performs a computation process as expressed by the following equation concerning the voltage control values $v_\alpha$ and $v_\beta$, which are outputted from the inverse Park transformation section 22, to calculate voltage command values $v_U$, $v_V$, and $v_W$ for the respective phases.

[Math. 16]

$$\begin{bmatrix} v_u \\ v_v \\ v_w \end{bmatrix} = \begin{bmatrix} 1 & 0 \\ -1/2 & \sqrt{3}/2 \\ -1/2 & -\sqrt{3}/2 \end{bmatrix} \quad (16)$$

The inverter 5 performs a computation process as expressed by the following equation using the voltage command values $v_U$, $v_V$, and $v_W$ for the respective phases, thus increasing or reducing duty ratios $D_U$, $D_V$, and $D_W$ of the pulse width modulation signals for the control of the gates of the driving elements 7U, 7V, 7W, 8U, 8V, and 8W for the respective phases from 0.5. In more detail, when the direct-current voltage $V_{BUS}$, which is applied to the driving elements 7U, 7V, 7W, 8U, 8V, and 8W, falls below an average voltage $V_{BUS(nominal)}$, the duty ratios $D_U$, $D_V$, and $D_W$ are calculated by Eq. (17). In more detail, in Eq. (17), each of the voltage command values $v_U$, $v_V$, and $v_W$ for the respective phases is divided by the reference voltage $V_{BUS(nominal)}$, and 0.5, which is an offset value for the duty ratio, is added to the result of the division. As a result, each of the duty ratios $D_U$, $D_V$, and $D_W$ preferably takes a value in the range of 0 to 1. Here, the correction of Eq. (17) reduces the duty ratio when the instantaneous voltage $V_{BUS(actual)}$ is greater than the reference voltage $V_{BUS(nominal)}$ due to, for example, a ripple, and increases the duty ratio when, conversely, the instantaneous voltage $V_{BUS(actual)}$ is smaller than the reference voltage $V_{BUS(nominal)}$. This contributes to reducing the distortion of the waveform of the electric drive current for each phase, and further reducing the vibrations and noise in the motor apparatus 1.

[Math. 17]

$$\begin{bmatrix} D_u \\ D_v \\ D_w \end{bmatrix} = \frac{1}{V_{BUS(nominal)}} \begin{bmatrix} v_u \\ v_v \\ v_w \end{bmatrix} + \begin{bmatrix} 0.5 \\ 0.5 \\ 0.5 \end{bmatrix} \quad (17)$$

Figure 4:
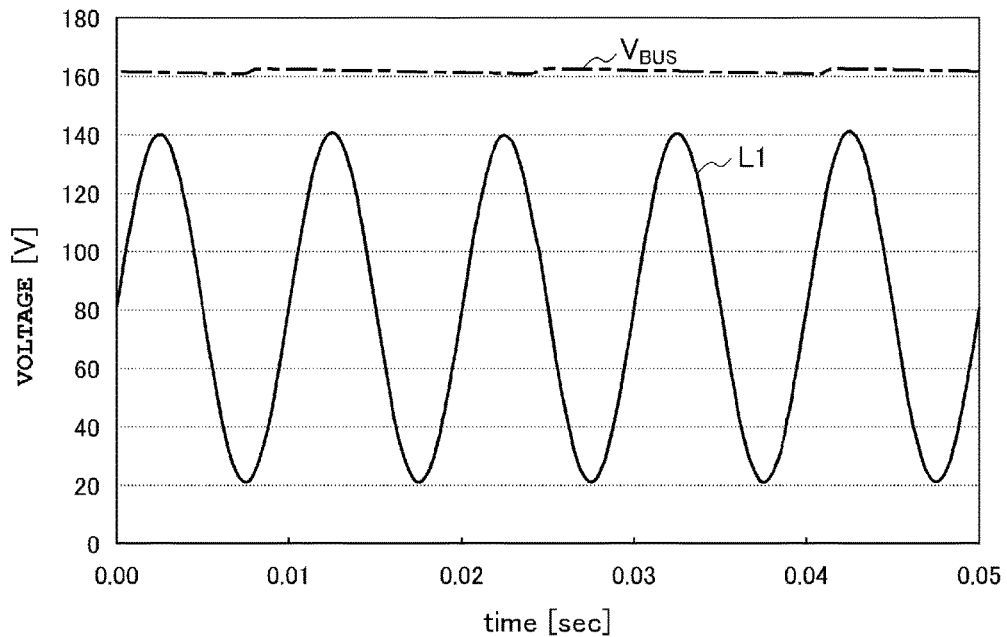
FIG. 4 is a signal waveform diagram illustrating an effect of a voltage fluctuation at a light load.
Figure 5:
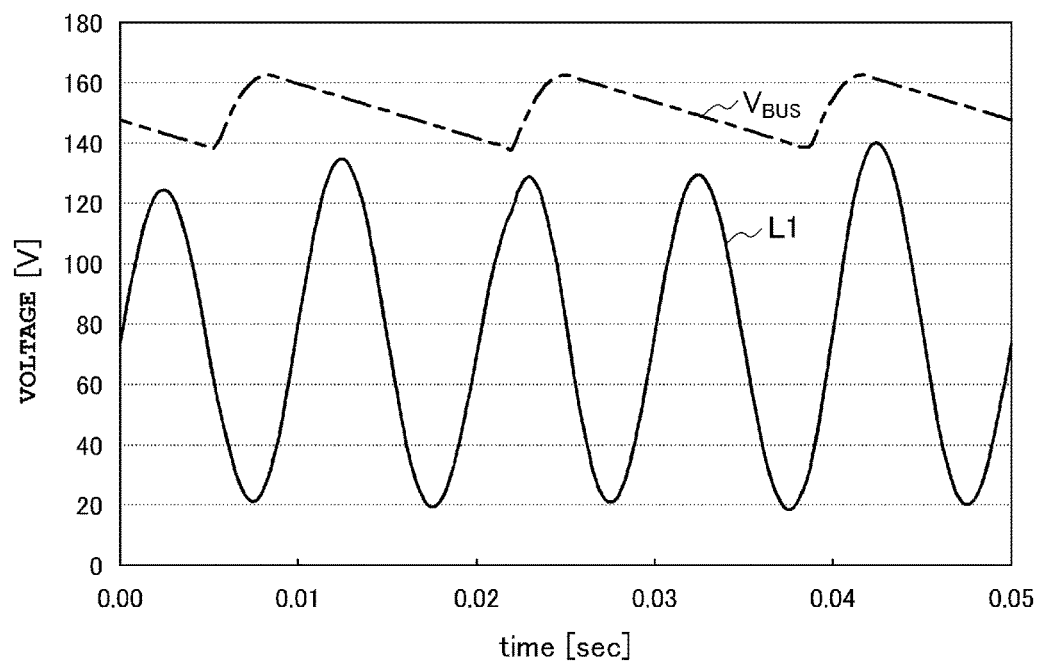
FIG. 5 is a signal waveform diagram illustrating an effect of a voltage fluctuation at a heavy load.

FIG. 4 is a signal waveform diagram showing the direct-current voltage $V_{BUS}$ and a waveform of the drive signal for each phase of the motor 2 in the case where the load on the motor 2 is light. FIG. 5 is a signal waveform diagram showing the direct-current voltage $V_{BUS}$ and a waveform of the drive signal for each phase of the motor 2 in the case where the load on the motor 2 is heavy. In each of FIGS. 4 and 5, the waveform of the drive signal for each phase is a waveform of an output signal from the inverter 5, and is denoted by reference symbol "L1". The waveform shown in each of FIGS. 4 and 5 is a waveform in the case where the control value is not corrected by the voltage command correction section 30. FIGS. 4 and 5 indicate that an increase in the load on the motor 2 causes an increase in a ripple in the voltage of the direct-current power, which causes a corresponding fluctuation in the amplitude value of the waveform of the output signal to the motor 2, resulting in a distortion in the waveform of the drive voltage.

Figure 6:
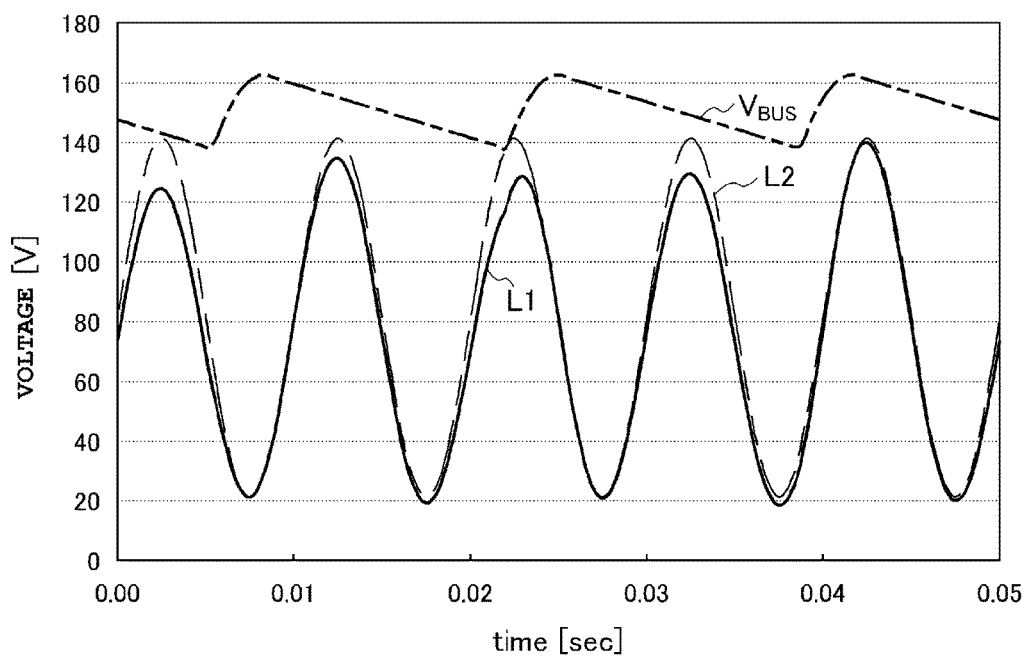
FIG. 6 is a signal waveform diagram for explaining a reduction in the effect of the voltage fluctuation.

FIG. 6 is a diagram illustrating the case where the control value has been corrected by the voltage command correction section 30, and is to be compared with FIG. 5. In FIG. 6, the waveform of the drive signal for each phase is denoted by reference symbol "L2". In FIG. 6, the peak value of the waveform L2 of the drive signal for each phase is maintained at a constant value even when the direct-current voltage $V_{BUS}$ changes. This shows that a distortion of the waveform of the drive voltage is prevented.

Figure 7:
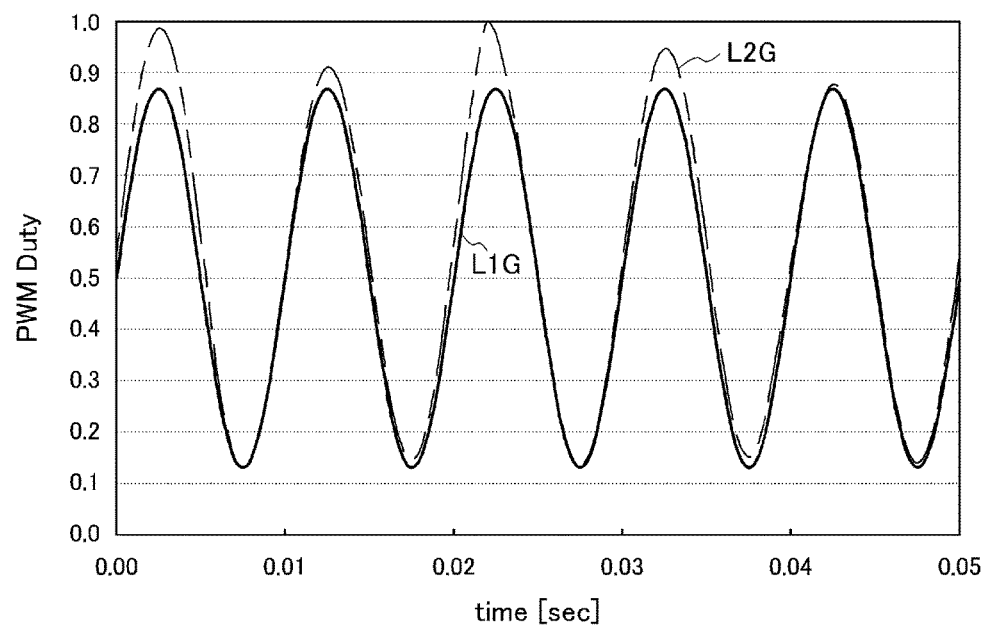
FIG. 7 is a signal waveform diagram for explaining the waveform of a drive voltage.

FIG. 7 is a diagram illustrating a U-phase duty ratio $D_U$ in the case where the control value is not corrected by the voltage command correction section 30, and a U-phase duty ratio $D_U$ in the case where the section 30. In the case where the control value is not corrected by the voltage command correction section 30, the amplitude of the U-phase duty ratio $D_U$ is maintained at a constant amplitude value, as represented by reference symbol "L1G". In contrast, in the case where the control value is corrected by the voltage command correction section 30, the amplitude value of the U-phase duty ratio $D_U$ is configured to increase and decrease in accordance with the compensation for the fluctuation in the direct-current voltage $V_{BUS}$, as represented by reference symbol "L2G". Specifically, the amplitude value of the U-phase duty ratio $D_U$ is configured to increase when the direct-current voltage $V_{BUS}$ decreases. In addition, the amplitude value of the U-phase duty ratio $D_U$ is configured to decrease when the direct-current voltage $V_{BUS}$ increases.

According to this embodiment, the amplitude of the drive signal for each driving element is increased or decreased in accordance with the voltage of the direct-current power obtained by rectifying the voltage from the alternating-current power supply. This allows the driving element to be switched on and off while reducing the fluctuation in the electric drive current due to the voltage fluctuation of the direct-current power. This contributes to further reducing the vibrations and noise of the motor.

Further, in the control of the motor by vector control, the control value is increased or decreased in accordance with the voltage of the direct-current power, and this allows each driving element to be driven while reducing the fluctuation in the electric drive current which fluctuates due to the fluctuation in the applied voltage. This contributes to further reducing the vibrations and noise of the motor.

Furthermore, the corrected control value is limited by the maximum value and the minimum value, and this enables stable driving of the motor 2 while preventing the control value from deviating from a range that allows control of each driving element.

Other Embodiments

While the embodiment of the present invention described above is applied to the blower apparatus that transports gas by driving the fan, the present invention is not limited to this, and is also widely applicable to a case where a fan is driven to transport liquid in such a manner that a condition of a constant flow is met.

Also, while the case where the motor is driven with the constant air volume control has been described in the foregoing description of the embodiment, the present invention is not limited to this, and is widely applicable to cases where a motor is driven with a desired rotation speed, a desired torque, or the like in accordance with an instruction from a higher-level controller. Note that, in the above-described preferred embodiment, the motor 2 does not include a position sensor, such as a Hall element, or a speed sensor, and the rotation speed and the position of the rotor of the motor 2 are estimated from the electric drive currents or the like. That is, the motor 2 is controlled by so-called sensorless vector control. Note, however, that the motor 2 may include a position sensor, such as, for example, a resolver or a Hall IC, and/or a speed sensor. In this case, a value(s) detected by the position sensor and/or the speed sensor is used in the control circuit 9.

Also, while the case where a fan motor formed by a three-phase brushless motor is driven has been described in the foregoing description of the embodiment, the present invention is not limited to this, and is widely applicable to cases where various types of motors are driven. The present invention is applicable not only to the surface permanent magnet synchronous motor, but also to an interior permanent magnet synchronous motor. Further, the present invention is applicable not only to an outer-rotor motor, but also to an inner-rotor motor, and is not particularly limited.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

Description of the Reference Characters

The invention claimed is:
1. A motor apparatus comprising:
an inverter arranged to drive a motor with a voltage outputted from a driving element;
a rectifier circuit arranged to rectify alternating-current power to generate direct-current power to be applied to the driving element;
a measuring section arranged to measure a voltage of the direct-current power; and
a control circuit arranged to control the inverter in accordance with a result of a measurement by the measuring section; wherein
the control circuit is arranged to vary an amplitude value of a drive signal to be applied to a base or gate of the driving element in a complementary manner in relation to a fluctuation in the voltage of the direct-current power;
the control circuit includes:
a Clarke transformation section arranged to subject an electric drive current of the motor to Clarke transformation;
a Park transformation section arranged to subject an output from the Clarke transformation section to Park transformation, and output a result of the Park transformation;
a calculation section arranged to process the output from the Park transformation section to calculate a control value;
a correction section arranged to correct the control value;
an inverse Park transformation section arranged to subject the control value corrected by the correction section to inverse Park transformation; and
an inverse Clarke transformation section arranged to subject an output from the inverse Park transformation section to inverse Clarke transformation;
the inverter is controlled in accordance with an output from the inverse Clarke transformation section; and
the control value is corrected by the correction section in accordance with the result of the measurement by the measuring section to vary the amplitude value of the drive signal to be applied to the base or gate of the driving element in the complementary manner in relation to the fluctuation in the voltage of the direct-current power.

2. The motor apparatus according to claim 1, wherein the control circuit includes a limiting section arranged to limit the control value corrected by the correction section by a maximum value and a minimum value.

3. The motor apparatus according to claim 1, wherein the control circuit includes a rotation speed detection section arranged to detect a rotation speed of the motor and output the detected rotation speed; and the calculation section includes:
- a multiplier arranged to multiply the detected rotation speed by a flow coefficient to calculate a target electric drive current;
- a subtractor arranged to calculate a difference between the target electric drive current and the output from the Park transformation section; and
- a controller arranged to generate the control value in accordance with an output from the subtractor.

* * * * *